(12) United States Patent
Resconi et al.

(10) Patent No.: US 7,615,597 B2
(45) Date of Patent: *Nov. 10, 2009

(54) PROCESS FOR THE COPOLYMERIZATION OF ETHYLENE

(75) Inventors: Luigi Resconi, Ferrara (IT); Anna Fait, Ferrara (IT); Nicoletta Mascellani, Bondeno (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/526,656

(22) PCT Filed: Aug. 19, 2003

(86) PCT No.: PCT/EP03/09183

§ 371 (c)(1),
(2), (4) Date: Mar. 3, 2005

(87) PCT Pub. No.: WO2004/122613

PCT Pub. Date: Mar. 18, 2004

(65) Prior Publication Data

US 2005/0234204 A1  Oct. 20, 2005

(30) Foreign Application Priority Data

Sep. 6, 2002  (EP) .................................. 02078739

(51) Int. Cl.
*C08F 4/76* (2006.01)
*C08F 4/64* (2006.01)
*C07F 17/00* (2006.01)

(52) U.S. Cl. ..................... 526/162; 526/171; 526/348.6; 526/348.5; 526/348; 526/943; 526/901; 526/941; 556/53

(58) Field of Classification Search ................. 526/172, 526/161, 348.6, 348.5, 348.2, 166; 556/53
See application file for complete search history.

(56) References Cited

U.S. PATENT DOCUMENTS 5,145,819 A  9/1992  Winter et al.

(Continued)

FOREIGN PATENT DOCUMENTS

DE  19903306  8/2000

(Continued)

OTHER PUBLICATIONS

A. Rossi et al., "End Groups in 1-Butene Polymerization via Methylaluminoxane and Zirconocene Catalyst," *Macromolecules*, vol. 28(6), pp. 1739-1749 (1995).

(Continued)

*Primary Examiner*—David Wu
*Assistant Examiner*—Rip A. Lee
(74) *Attorney, Agent, or Firm*—William R Reid

(57) ABSTRACT

A process for producing a polymer of ethylene containing from 0.1 to 99% by mol of one or more derived units of alpha-olefins and optionally from 0 to 5% by mol polyene, comprising contacting ethylene, one or more alpha-olefins and optionally said polyene, in the presence of a catalyst system obtainable by contacting:

a) a metallocene compound of formula (I):

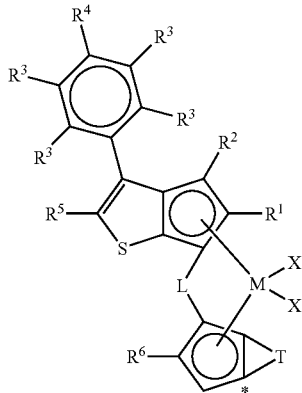

(I)

wherein

M is zirconium, hafnium or titanium; X, is a hydrogen atom, a halogen atom, or a hydrocarbon group; $R^1$ is a hydrocarbon group;

$R^2$, $R^3$, $R^4$ and $R^5$ are hydrogen atoms, or hydrocarbon groups; $R^6$ is a hydrocarbon group; L is a divalent bridging group, and T is a divalent radical of formula (II) or (III):

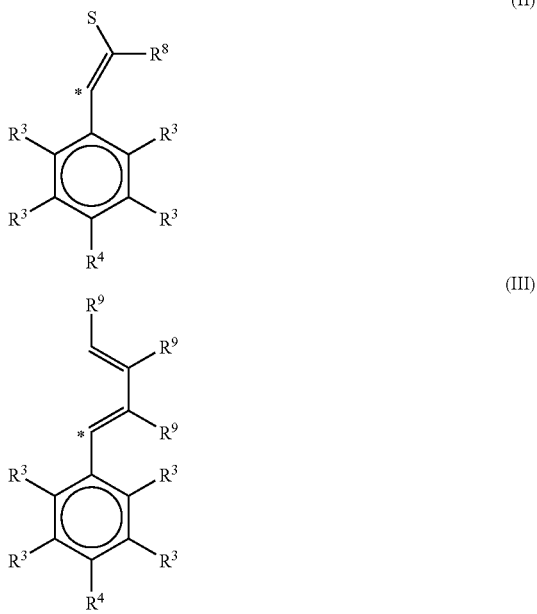

wherein
$R^8$ and $R^9$ are hydrogen or hydrocarbon groups; and
b) an alumoxane or a compound capable of forming an alkyl metallocene cation.

8 Claims, No Drawings

U.S. PATENT DOCUMENTS

| | | | |
|---|---|---|---|
| 5,280,074 A | 1/1994 | Schreck et al. | |
| 5,753,769 A | 5/1998 | Ueda et al. | |
| 5,753,773 A | 5/1998 | Langhauser et al. | |
| 5,770,753 A | 6/1998 | Küber et al. | |
| 5,786,432 A | 7/1998 | Küber et al. | |
| 5,830,821 A | 11/1998 | Rohrmann et al. | |
| 5,840,644 A | 11/1998 | Küber et al. | |
| 5,854,354 A | 12/1998 | Ueda et al. | |
| 5,969,049 A | 10/1999 | Ueda et al. | |
| 6,051,727 A | 4/2000 | Küber et al. | |
| 6,096,841 A | 8/2000 | Sacchetti et al. | |
| 6,191,294 B1 | 2/2001 | Resconi et al. | |
| 6,242,544 B1 | 6/2001 | Küber et al. | |
| 6,255,506 B1 | 7/2001 | Küber et al. | |
| RE37,384 E | 9/2001 | Winter et al. | |
| 6,306,996 B1 | 10/2001 | Cecchin et al. | |
| 6,383,969 B1 | 5/2002 | Francois et al. | |
| 6,444,833 B1* | 9/2002 | Ewen et al. | 556/11 |
| 6,451,726 B1 | 9/2002 | Zambon et al. | |
| 6,469,114 B1* | 10/2002 | Schottek et al. | 526/127 |
| 6,482,902 B1* | 11/2002 | Bohnen et al. | 526/127 |
| 6,492,465 B1 | 12/2002 | Burkhardt et al. | |
| 6,492,539 B1 | 12/2002 | Bingel et al. | |
| 6,608,224 B2* | 8/2003 | Resconi et al. | 556/27 |
| 6,627,764 B1* | 9/2003 | Schottek et al. | 556/11 |
| 6,635,779 B1* | 10/2003 | Ewen et al. | 556/11 |
| 6,723,865 B2 | 4/2004 | Evain et al. | |
| 6,797,794 B2 | 9/2004 | Zambon et al. | |
| 6,841,501 B2 | 1/2005 | Resconi et al. | |
| 6,870,016 B1 | 3/2005 | Burkhardt et al. | |
| 6,878,786 B2 | 4/2005 | Resconi et al. | |
| 6,930,190 B2 | 8/2005 | Nifant'ev et al. | |
| 6,987,196 B2* | 1/2006 | Resconi et al. | 556/11 |
| 7,009,015 B2 | 3/2006 | Evain et al. | |
| 7,019,157 B2 | 3/2006 | Uwai et al. | |
| 7,022,793 B2 | 4/2006 | Galimberti et al. | |
| 7,041,750 B1 | 5/2006 | Covezzi et al. | |
| 7,074,864 B2 | 7/2006 | Resconi | |
| 7,109,278 B2 | 9/2006 | Okumura et al. | |
| 7,115,761 B2 | 10/2006 | Resconi et al. | |
| 7,122,498 B2 | 10/2006 | Hart et al. | |
| 7,141,637 B2 | 11/2006 | Elder et al. | |
| 7,183,332 B2 | 2/2007 | Ferraro et al. | |
| 7,297,747 B2 | 11/2007 | Hart et al. | |
| 2002/0107344 A1 | 8/2002 | Peterson | |
| 2003/0008984 A1 | 1/2003 | Kratzer et al. | 526/127 |
| 2003/0013913 A1* | 1/2003 | Schottek et al. | 564/8 |
| 2003/0149199 A1 | 8/2003 | Schottek et al. | |
| 2004/0192931 A1 | 9/2004 | Nifant'ev et al. | 548/452 |
| 2005/0192418 A1 | 9/2005 | Ewen et al. | |
| 2006/0020096 A1 | 1/2006 | Schottek et al. | |
| 2006/0094840 A1 | 5/2006 | Resconi et al. | |
| 2006/0167195 A1 | 7/2006 | Resconi et al. | |
| 2006/0252637 A1 | 11/2006 | Okumura | |
| 2006/0287436 A1 | 12/2006 | Pelliconi et al. | |
| 2007/0060727 A1 | 3/2007 | Pelliconi et al. | |
| 2007/0117940 A1 | 5/2007 | Suhm et al. | |
| 2007/0149729 A1 | 6/2007 | Resconi | |
| 2007/0276095 A1 | 11/2007 | Resconi et al. | |
| 2007/0299208 A1 | 12/2007 | Resconi et al. | |

FOREIGN PATENT DOCUMENTS

| | | |
|---|---|---|
| DE | 19917985 | 10/2000 |
| DE | 19962814 | 6/2001 |
| DE | 19962910 | 7/2001 |
| EP | 129 368 | 12/1984 |
| EP | 172 961 | 3/1986 |
| EP | 353 318 | 2/1990 |
| EP | 0633272 | 1/1995 |
| EP | 697 418 | 2/1996 |
| EP | 0775707 | 5/1997 |
| EP | 846 696 | 6/1998 |
| EP | 1 308 466 | 5/2003 |
| JP | 03126704 | 5/1991 |
| JP | 06026804 | 2/1994 |
| WO | 9102012 | 2/1991 |
| WO | 9200333 | 1/1992 |
| WO | 9532995 | 12/1995 |
| WO | 98/22486 | 5/1998 |
| WO | 9921899 | 5/1999 |
| WO | 99/36427 | 7/1999 |
| WO | 99/40129 | 8/1999 |
| WO | 99/45043 | 9/1999 |
| WO | 0121674 | 3/2001 |
| WO | 01/44318 | 6/2001 |
| WO | 01/46272 | 6/2001 |
| WO | 0144318 | 6/2001 |
| WO | 01/48034 | 7/2001 |
| WO | 01/62764 | 8/2001 |
| WO | 0162764 | 8/2001 |
| WO | 02/02659 | 1/2002 |
| WO | 02/083699 | 10/2002 |
| WO | 02100908 | 12/2002 |
| WO | 02100909 | 12/2002 |
| WO | 03/014107 | 2/2003 |
| WO | 03045964 | 5/2003 |
| WO | 03070778 | 8/2003 |
| WO | 2004/005360 | 1/2004 |
| WO | 2004/033510 | 7/2006 |

OTHER PUBLICATIONS

N. Naga et al., "Effect of co-catalyst system on α-olefin polymerization with rac-and meso-[dimethylsilylenebis(2,3,5-trimethylcyclopentadienyl)]zirconium dichloride," *Macromol, Rapid Commun.*, vol. 18, pp. 581-589 (1997).

M. Vathauer et al., "Homopolymerizations of α-Olefins with Diastereomeric Metallocene/MAO Catalysts," vol. 33(6), pp. 1955-1959 (2000).

U.S. Appl. No. 11/376,406, filed Mar. 15, 2006, Resconi.

U.S. Appl. No. 11/376,409, filed Mar. 15, 2006, Resconi.

C. Carman et al., "Monomer Sequence Distribution in Ethylene-Propylene Rubber Measured by $^{13}$C NMR. 3. Use of Reaction Probability Model," *Macromolecules*, vol. 10(3), pp. 536-544 (1977).

V. Busico et al., "Regiospecificty of 1-butene polymerization catalyzed by $C_2$-symmetric group IV metallocenes," *Macromol. Rapid Commun.*, vol. 16, pp. 269-274 (1995).

L Ewen et al., "Chiral *Ansa* Metallocenes with Cp Ring-Fused to Thiophenes and Pyrroles: Syntheses, Crystal Structures, and Isotactic Polypropylene Catalysts," *J. Am. Chem. Soc.*, vol. 123(20), pp. 4763-4773 (2001) XP-002233282.

* cited by examiner

PROCESS FOR THE COPOLYMERIZATION OF ETHYLENE

This application is the U.S. national phase of International Application PCT/EP2003/009183, filed Aug. 19, 2003.

The present invention relates to a process for the polymerization of ethylene and one or more alpha-olefins of formula $CH_2=CHZ$, wherein Z is a $C_2$-$C_{20}$ alkyl radical, in the presence of a metallocene catalyst.

It is known that polyethylene can be modified by the addition, during the polymerization reaction, of small quantities of alpha-olefins, generally 1-butene, 1-hexene or 1-octene. This gives LLDPE (linear low density polyethylene) copolymers which have short branches along the main chain due to the units derived from the alpha-olefin comonomers. These branches have the effect that the degree of crystallinity and hence the density of copolymer turn out to be lower than in polyethylene homopolymer. Typically, the LLDPE copolymers have densities of the order of 0.915-0.940 g/cm³. Consequently, the LLDPE copolymers have advantageous mechanical properties, in particular for the production of films.

The lowering of the degree of crystallinity and of the density of the copolymers depends on the type and quantity of the incorporated alpha-olefin. In particular, the greater the quantity of incorporated alpha-olefin, the lower are the resulting degrees of crystallinity and density. Besides the type and quantity of the incorporated alpha-olefin comonomer, the properties of the copolymer depend on the distribution of the branches along the polymer chain. In particular, a uniform distribution of the branches has relevant effects on the properties of the copolymers. In fact, with the same type and quantity of incorporated alpha-olefin, a higher uniformity of distribution allows lower degrees of crystallinity and density to be obtained.

Metallocene compounds having two bridged cyclopentadienyl groups are known as catalyst components for the homo- and copolymerization reaction of ethylene. A drawback of the use of metallocene catalysts is that the comonomer incorporation ability is quite low, and therefore it is necessary to use a large excess of comonomer in order to achieve copolymers having the desired comonomer content. Moreover, it is desirable to have a metallocene compound having an high activity in terms of obtained polymer, and a good comonomer incorporation ability so that it is sufficient to use a small excess of comonomer in the reactor; it is also desirable to find a metallocene catalyst able to give copolymers having a high molecular weight.

In WO 01/44318 it is described a new class of metallocene compounds in which the n ligands are substituted thiopentalenes; in this document there are no examples relating to LLDPE polymers.

The applicant has now found a class of metallocene compounds having a good balance of the above-mentioned technical effects and in a special way having a high activity.

According to a first aspect of the present invention, it is provided a process for producing a polymer of ethylene containing from 0.1 to 99% by mol of one or more derived units of alpha-olefins of formula $CH_2=CHZ$, wherein Z is a $C_2$-$C_{20}$ alkyl radical, and optionally from 0% to 5% by mol polyene, comprising contacting, under polymerization conditions, ethylene, one or more alpha-olefins and optionally said polyene, in the presence of a catalyst system obtainable by contacting:

a) a metallocene compound of formula (I):

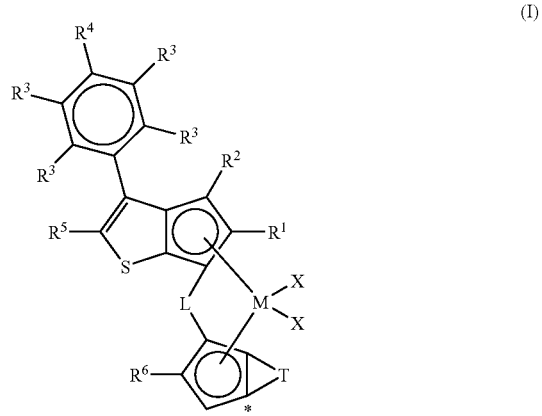

wherein
M is zirconium, hafnium or titanium;
X, equal to or different from each other, is a hydrogen atom, a halogen atom, a R, OR, OR'O, $OSO_2CF_3$, OCOR, SR, $NR_2$ or $PR_2$ group, wherein R is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing one or more heteroatoms belonging to groups 13-17 of the Periodic Table of the Elements; and the R' substituent is a divalent group selected from $C_1$-$C_{40}$-alkylidene, $C_6$-$C_{40}$-arylidene, $C_7$-$C_{40}$-alylarylidene or $C_7$-$C_{40}$-arylalkylidene radicals; two X can also join to form a $C_4$-$C_{40}$ dienyl ligand, preferably a 1-3 dienyl ligand; examples of $C_1$-$C_{20}$ alkyl radicals are methyl, ethyl, n-propyl, isopropyl, n-butyl, i-butyl, s-butyl, t-butyl, n-pentyl, n-hexyl, n-heptyl and n-octyl radicals; examples of $C_3$-$C_{20}$-cycloalkyl radicals are cyclopentyl and cyclohexyl; preferably X is a halogen atom, a R, OR'O or OR group; more preferably X is chlorine or methyl;

$R^1$ is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing one or more heteroatoms belonging to groups 13-17 of the Periodic Table of the Elements; preferably $R^1$ is a linear or branched, saturated or unsaturated $C_1$-$C_{20}$-alkyl radical;

$R^2$, $R^3$, $R^4$ and $R^5$, equal to or different from each other, are hydrogen atoms, halogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; preferably $R^2$ is a hydrogen atom; preferably $R^3$ is a hydrogen atom or a linear or branched, saturated or unsaturated $C_1$-$C_{20}$-alkyl radical optionally containing one or more halogen atom; preferably $R^4$ is a hydrogen atom or a linear or branched, saturated or unsaturated $C_1$-$C_{20}$-alkyl radical, more preferably $R^4$ is hydrogen or a group $—C(R^7)_3$, wherein $R^7$, equal to or different from each other, is a linear or branched, saturated or unsaturated $C_1$-$C_8$-alkyl radical; and preferably $R^5$ is a linear or branched, saturated or unsaturated $C_1$-$C_{10}$-alkyl radical;

$R^6$ is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing one or more heteroatoms belonging to groups 13-17 of the Periodic Table of the Elements; preferably $R^6$ is a linear or branched, saturated or unsaturated $C_1$-$C_{20}$-alkyl radical;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals, optionally containing heteroatoms belonging to groups 13-17 of the Periodic Table of the Elements, or it is a silylidene radical containing up to 5 silicon atoms, such as $SiMe_2$ and $SiPh_2$; preferably L is $Si(CH_3)_2$, $SiPh_2$, SiPhMe, $SiMe(SiMe_3)$, $CH_2$, $(CH_2)_2$, $(CH_2)_3$, $C(CH_3)_2$; $C(Ph)_{2; or\ C(CH3)}$ (Ph);

T is a divalent radical of formula (II) or (III):

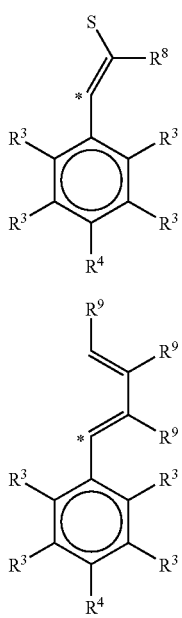

(II)

(III)

wherein the atom marked with the symbol * is linked to the atom marked with the same symbol in the compound of formula (I);

$R^3$ and $R^4$ have the meaning previously described;

$R^8$ is a hydrogen atom or a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optional containing one or more heteroatoms belonging to groups 13-17 of the Periodic Table of the Elements; preferably $R^8$ is hydrogen or a linear or branched, saturated or unsaturated $C_1$-$C_{20}$-alkyl;

$R^9$, equal to or different from each other, is a hydrogen atom or a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing one or more heteroatoms belonging to groups 13-17 of the Periodic Table of the Elements; preferably $R^9$ is hydrogen or a linear or branched, saturated or unsaturated $C_1$-$C_{20}$-alkyl radical;

b) an alumoxane or a compound capable of forming an alkyl metallocene cation; and optionally c) an organo aluminum compound.

Preferably the metallocene compound of formula (I) is in the racemic form.

Preferred radicals of group T are those of formula (II).

In a particular embodiment, the compound of formula (I) has formulas (IV) or (V):

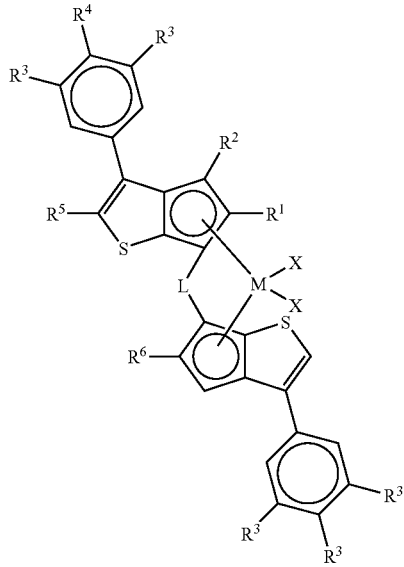

(IV)

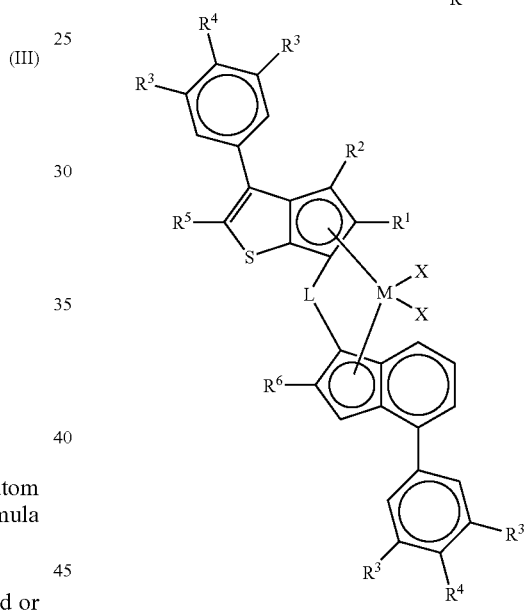

(V)

wherein $R^1$, $R^2$, $R^5$, $R^6$, L, M and X have been described above;

$R^3$ is a hydrogen atom or a linear or branched, saturated or unsaturated $C_1$-$C_{10}$-alkyl radical, optionally containing one or more halogen atom; more preferably $R^3$ is a hydrogen atom or a group —$C(R^7)_3$, wherein $R^7$, equal to or different from each other, is a linear or branched, saturated or unsaturated $C_1$-$C_8$-alkyl radical; $R^4$ is a hydrogen atom or a linear or branched, saturated or unsaturated $C_1$-$C_{10}$-alkyl radical, more preferably $R^4$ is hydrogen or a group —$C(R^7)_3$, wherein $R^7$, equal to or different from each other, is a linear or branched, saturated or unsaturated $C_1$-$C_8$-alkyl radical;

In a further embodiment of the compounds of formulas (IV) and (V), $R^3$ and $R^4$ are hydrogen atoms. In another embodiment of the compounds of formulas (I), (IV) and (V), when $R^3$ is an hydrogen atom, $R^4$ is a linear or branched, saturated or unsaturated $C_1$-$C_{10}$-alkyl radical optionally containing one or more halogen atom; or when $R^3$ is a linear or branched, saturated or unsaturated $C_1$-$C_{10}$-alkyl radical, optionally containing one or more halogen atom, $R^4$ is an hydrogen atom.

Non limiting examples of compounds of formula (I) are:
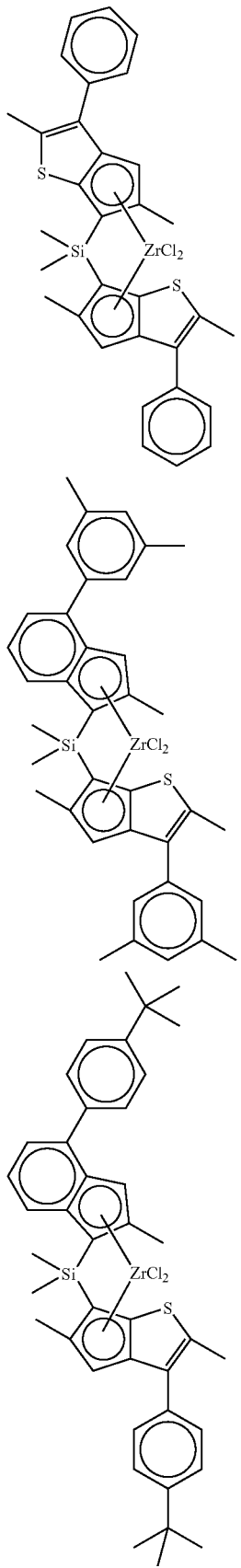
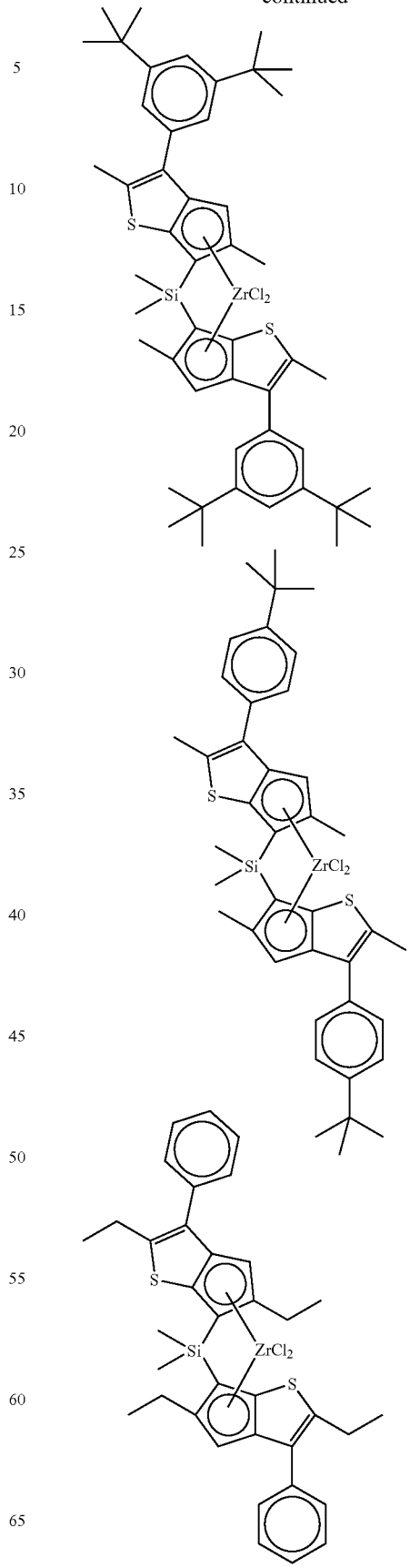

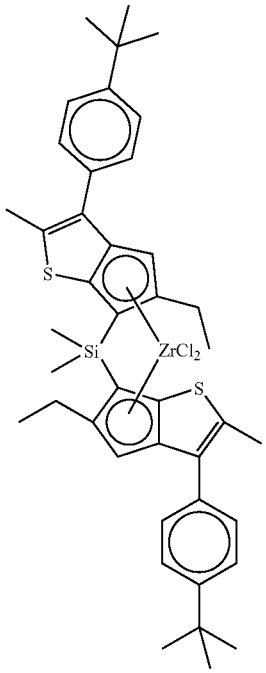

Compounds of formula (I) can be prepared as described in WO 01/44318, EP 02075757.1, EP01204624.9 and EP01202930.2.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The molar ratio between aluminium and the metal of the metallocene generally is comprised between about 10:1 and about 30,000:1, preferably between about 100:1 and about 5,000:1.

The alumoxanes used in the catalyst according to the invention are considered to be linear, branched or cyclic compounds containing at least one group of the type:

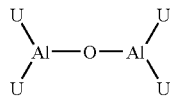

wherein the substituents U, same or different, are described above.

In particular, alumoxanes of the formula:

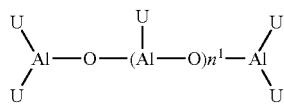

can be used in the case of linear compounds, wherein $n^1$ is 0 or an integer of from 1 to 40 and the substituents U are defined as above, or alumoxanes of the formula:

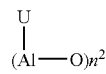

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds according to WO 99/21899 and WO01/21674 are:
tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris[2-phenyl-butyl)aluminium, tris(3-methyl-2-phenyl-butyl)aluminium, tris(2-phenyl-pentyl]aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion E⁻ is an anion of the formula BAr₄⁽⁻⁾, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula BAr₃ can conveniently be used. Compounds of this type are described, for example, in the published International patent application WO 92/00333. Other examples of compounds able to form an alkylmetallocene cation are compounds of formula BAr₃P wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula D⁺E⁻ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetradis(pentafluorophenyl)borate,
Triphenylcarbeniumtetradis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate, Organic aluminum compounds used as compound c) are those of formula $H_jAlU_{3-j}$ or $H_jAl_2U_{6-j}$ described above.

The catalysts system used in the process of the present invention can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, organic polymer, preferably polyolefins such as styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at a temperature ranging from 25° C. to 90° C.

A suitable class of supports which can be used is that constituted by porous organic supports functionalized with groups having active hydrogen atoms. Particularly suitable are those in which the organic support is a partially crosslinked styrene polymer. Supports of this type are described in European application EP 633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The solid compound thus obtained, in combination with the further addition of the alkylaluminium compound either as such or prereacted with water if necessary, can be usefully employed in the gas-phase polymerization.

The process for the polymerization of olefins according to the invention can be carried out in the liquid phase in the presence or absence of an inert hydrocarbon solvent, or in the gas phase; preferably, the process is carried out in the gas phase. The hydrocarbon solvent can either be aromatic such as toluene, or aliphatic such as propane, hexane, heptane, isobutane or cyclohexane.

The polymerization temperature is generally comprised between −100° C. and +100° C. and, particularly between 10° C. and +90° C. The polymerization pressure is generally comprised between 0.5 and 100 bar.

The lower the polymerization temperature, the higher are the resulting molecular weights of the polymers obtained.

The polymerization yields depend on the purity of the metallocene compound of the catalyst. The metallocene compounds obtained by the process of the invention can therefore be used as such or can be subjected to purification treatments.

The components of the catalyst can be brought into contact with each other before the polymerization. The pre-contact concentrations are generally between 0.1 and 10⁻⁸ mol/l for the metallocene component a), while they are generally between 2 and 10⁻⁸ mol/l for the component b). The pre-contact is generally effected in the presence of a hydrocarbon solvent and, if appropriate, of small quantities of monomer. In the pre-contact it is also possible to use a non-polymerizable olefin such as isobutene, 2-butene and the like.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover by carrying out the polymerization process by using a combination of two different metallocene compounds of formula (I) a polymer endowed with a broad melting point is produced.

In the copolymers obtainable by the process of the invention, the content of ethylene derived units is between 1% by mol and 99.9% by mol; preferably is it between 40% by mol and 98% by mol; and more preferably it is between 50% by mol and 98% by mol.

The content of alpha-olefins derived units is between 0.1% by mol and 99% by mol; preferably it is between 2% by mol and 60% by mol; and more preferably it is between 5% by mol and 50% by mol.

Non-limiting examples of alpha-olefins of formula CH₂═CHZ which can be used as alpha-olefins in the process of the invention are 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and l-eicosene. Preferred comonomers are 1-pentene, 1-hexene and 1-octene.

The content of polyene derived units, if any, is preferably comprised between 0% and 5% by mol, and more preferably between 0 mol % and 3 mol %.

The polyenes that can be used as comonomers in the copolymers according to the present invention are included in the following classes:

non-conjugated diolefins able to cyclopolymerize such as, for example, 1,5-hexadiene, 1-6-heptadiene, 2-methyl-1,5-hexadiene;

dienes capable of giving unsaturated monomeric units, in particular conjugated dienes such as, for example, butadiene and isoprene, and linear non-conjugated dienes, such as, for example, trans 1,4-hexadiene, cis 1,4-hexadiene, 6-methyl-1,5-heptadiene, 3,7-dimethyl-1,6-octadiene, 11-methyl-1,10-dodecadiene, and cyclic non-conjugated dienes such as 5-ethylidene-2-norbornene.

With the process of the present invention it is possible to obtain, in high yields, copolymers having a high molecular weight (I.V.) that makes the process object of the present invention fit for an industrial use. Moreover, since the use of the metallocene compounds of formula (I) gives rise to a high comonomer incorporation, this allows to use smaller concentration of the comonomer in the reactor and provides a more tunable process.

The intrinsic viscosity values of the copolymers obtained with the process of the present invention are generally higher than 0.5 dL/g, and preferably they range from 1.5 to 10 dL/g. The following examples are given for illustrative purposes and do not intend to limit the invention.

EXAMPLES

General Procedures

All operations were performed under nitrogen by using conventional Schlenk-line techniques. Heptane and toluene were purified by degassing with $N_2$ and passing over activated (8 hours, $N_2$ purge, 300° C.) $Al_2O_3$, and stored under nitrogen. 1-hexene (Aldrich) was dried over alumina and distilled over $LiAlH_4$. Polymerization grade ethylene was obtained from the Basell Ferrara plant. MAO (methylalumoxane, Witco) was purchased as a 10 wt.-% solution in toluene, dried under vacuum to remove most of the free trimethylaluminuim and used as 1 M toluene solution. TIBA (Al(i-Bu)$_3$, Witco) was used as 1 M toluene solution.

$^1$H-NMR spectra of copolymers were recorded at 120° C. on a Bruker DPX-400 spectrometer operating at 100.61 MHz, in the Fourier transform mode. The samples were prepared by dissolution of 10 mg of copolymer in 0.5 mL of 1,1,2,2-tetrachloroethane-d$_2$ at 120° C. When the end-group analysis had to be performed, the samples were prepared under inert atmosphere. The peak of $C_2HDCl_2$ (5.95 ppm) was used as internal standard. Each spectrum was acquired with a 45° pulse and 20 seconds of delay between pulses (or 5 seconds when the end-group analysis had to be performed). About 16 transients (or 1K when the end-group analysis had to be performed) were stored in 32K data points using a spectral window of 16 ppm.

The 1-hexene content in the copolymers was calculated from the methylene and methyne peak integral ($I_A$) and the methyl peak integral ($I_B$), by applying the following relationships:

$[C_6]=I_B/3$ $[C_2]=(I_A-3I_B)/4$ $\Sigma=[C_6]+[C_2]=(I_B/3)+(I_A-3I_B)/4$ $C_{6\ copol}(\% \text{ mol})=100\times[C_6]/\Sigma=100\times I_B/3\Sigma$ The molecular weight distribution was determined on a WATERS 150 C using the following chromatographic conditions:

| | |
|---|---|
| Columns: | 3x SODEX AT 806 MS; 1x SODEX UT 807; 1x SODEX AT-G; |
| Solvent: | 1,2,4 trichlorobenzene (+0.025% 2,6-di-tert-butyl-4-methyl-phenol) |
| Flow rate: | 0.6-1 mL/min |
| Temperature: | 135° C. |
| Detector: | Infrared at $\lambda \approx 3.5$ μm |
| Calibration: | Universal Calibration with PS-Standard |

The intrinsic viscosity (I.V.) was measured in decaline (DHN) at 135° C.

The melting point ($T_m$) and glass transition temperatures ($T_g$) were determined on a DSC30 Mettler instrument equipped with a cooling device, by heating the sample from 25° C. to 200° C. at 20° C./min, holding for 10 min at 200° C., cooling from 200° C. to −140° C., the peak temperature was taken as crystallization temperature ($T_c$). Holding for 2 min at −140° C., heating from −140° C. to 200° C. at 20° C./min. The reported values are those determined from the second heating scan. The area of the second scan was taken as global melting enthalpy ($\Delta H_f$).

In cases in which crystallization phenomena overlap with the glass transition, for a best determination of the $T_g$ value, the samples were heated at 200° C. with a scanning speed corresponding to 20° C./minute, quickly cooled to a temperature lower than the $T_m$ (usually 20, 0 or −20° C.) at 200° C./minute, and kept at this temperature for 720 minutes. The samples were then further quickly cooled to −140° C. with a scanning speed corresponding to 200° C./minute and finally re-heated to 200° C. with a scanning speed corresponding to 20° C./minute. All the process was carried out under nitrogen flow of 20 mL/minute.

Determination of Liquid Phase Composition

The liquid phase composition was calculated from the Redlich-Kwong-Soave. This set of thermodynamic equations was selected among those available in Aspen Plus™ (commercialized by Aspen Technology Inc., Release 9) on the basis of a comparison with the experimental results. The concentrations of the comonomers were hence calculated.

Metallocene Compounds

Dimethylsilylbis(2-methyl-4,5-benzo-1-indenyl) zirconium dichloride [C1]

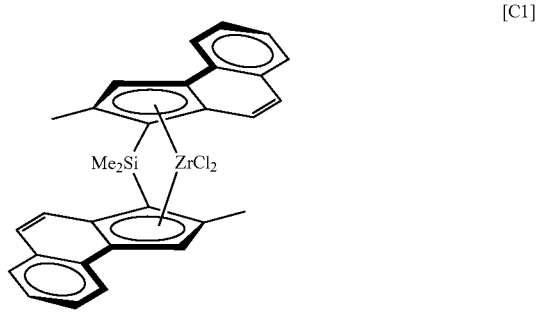

was prepared as described in U.S. Pat. No. 5,830,821.

Dimethylsilylbis(2-methyl-4-phenyl-1-indenyl)zirconium dichloride [C2]

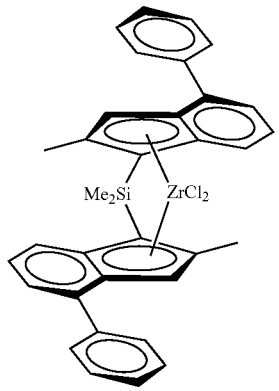

[C2]

was prepared as described in U.S. Pat. No. 5,786,432.

Dimethylsilylbis(2,5-dimethyl-3-phenyl-cyclopento[2,3-b]thiophen-6-yl) zirconium dichloride [A1]

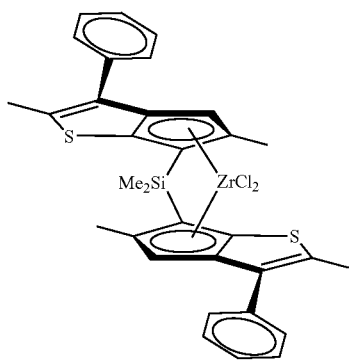

[A1]

was prepared as described in WO 01/44318

Polymerization Examples 1-9

General Procedure

Ethylene/1-hexene copolymerizations were carried out in a 260-mL Büchi glass autoclave equipped with magnetic stirrer, thermocouple and feeding line for the monomer, purified with nitrogen and kept in a thermostatic bath. Heptane and 1-hexene (150 mL of total volume, amount of 1-hexene is reported in table 1) and trisobutylaluminum (TIBA) (0.5 mmol) were introduced and warmed to 70° C., then the autoclave was purged with ethylene. The catalytic system was separately prepared in 5 mL of toluene by mixing the amounts of metallocene reported in table 1 and methylalumoxane (MAO) (MAO/Zr ratio 500 mol/mol). After about 30 sec of stirring at room temperature, the solution was introduced into the autoclave under ethylene flow. The reactor was closed and pressurized at 4 bar-g; the temperature was raised to 70° C. and the pressure was kept constant by feeding in ethylene. The polymerization was stopped after the time indicated in table 1 by degassing the reactor and by adding 2 mL of methanol. The polymer was precipitated with 200 mL of acetone, filtered, washed with acetone and dried overnight at 60° C. under reduced pressure. Polymerization and polymer data are reported in table 1.

Polymerization Example 10

Supported catalyst containing A1 was prepared according to example 50 of WO01/44318, The analysis of the obtained supported catalyst is: 5.75% wt. Al and 470 ppm Zr, with an Al/Zr molar ratio of 412.

A 4 L autoclave, equipped with a blade turbine magnetic stirrer, pressure indicator, temperature indicator, system for loading the catalyst, feed line for monomer equipped with a thermal-mass flowmeter for the measure of the ethylene uptake and a thermosetting jacket, was used. At room temperature 2.5 mmol of TIBA (100 g/L hexane solution) as scavenger and 50 g of 1-hexene were loaded, followed by 1.6 L of propane; then the reactor was pressurized with 5 bar of ethylene partial pressure. The polymerization was started by injecting the catalyst at 30° C. A prepolymerization step was carried out at 30° C. for 30 minutes, then the temperature was raised up to 75° C. and the ethylene partial pressure was increased to 10 bar. These conditions were maintained by continuously feeding ethylene for 2 hour. The obtained ethylene copolymer has a 1-exene content of 10.9% by mol, a melting point of 112.7° C., I.V. of 2.76 dl/g, density of 0.9079 Kg/dm$^3$ and $r1 \times r2 = 0.97$.

TABLE 1

| Ex. | Metallocene type | Metallocene μmol | 1-hexene (ml) | 1-hexene (g) | Yield (g) | Time (min) | Activity (Kg$_{pol}$/m mol$_{Zr}$·h) | C$_6$ content (% mol) exper. | C$_6$ content (% wt) calc. | Conversion (%) 100 × (gC$_6$ copol/gC$_6$ feed) | I.V. (dL/g) | M$_w$/M$_n$ | T$_g$ (° C.) | T$_m$ (° C.) | ΔH$_f$ (J/g) | T$_c$ (° C.) |
|---|---|---|---|---|---|---|---|---|---|---|---|---|---|---|---|---|
| 1* | C2 | 0.2 | 2 | 1.32 | 0.5 | 5 | 30.6 | 10.3 | 25.7 | 9.9 | 2.96 | 2.48 | −44.3 | 82.5 | 44.1 | 52.2 |
| 2* | C2 | 0.3 | 5 | 3.29 | 1.3 | 5 | 51.2 | 21.5 | 45.0 | 17.5 | 2.17 | 2.39 | −51.3 | n.d. | n.d. | 2.0 |
| 3* | C2 | 0.3 | 10 | 6.59 | 1.1 | 7 | 30.3 | 32.6 | 59.2 | 9.5 | 1.72 | 2.51 | −56.0 | n.d. | n.d. | −50.0 |
| 4* | C1 | 0.25 | 2 | 1.32 | 1.2 | 3 | 95.2 | 7.7 | 20.0 | 18.1 | 2.59 | 2.56 | −39.3 | 89.3 | 63.6 | 68.8 |
| 5* | C1 | 0.3 | 5 | 3.29 | 1.1 | 3 | 74.7 | 11.4 | 27.8 | 9.4 | 2.30 | 2.77 | −49.1 | 66.6 | 37.7 | 46.2 |
| 6* | C1 | 0.3 | 10 | 6.59 | 0.7 | 3 | 43.3 | 18.9 | 41.1 | 4.1 | 1.91 | 2.24 | −49.2 | 40.0 | n.d. | 4.9 |
| 7 | A1 | 0.2 | 2 | 1.32 | 1.3 | 3 | 131.0 | 10.9 | 26.8 | 26.6 | 2.74 | 2.76 | −47.4 | 68.5 | 41.6 | 47.9 |
| 8 | A1 | 0.2 | 5 | 3.29 | 1.1 | 2 | 166.5 | 18.9 | 41.1 | 13.9 | 2.29 | 2.52 | −52.5[#] | 35.4 | 43.4 | 5.8 |
| 9 | A1 | 0.2 | 10 | 6.59 | 1.3 | 2 | 196.5 | 25.6 | 50.8 | 10.1 | 2.01 | 2.72 | −55.7 | n.d. | n.d. | −33.7 | n.d. = not determinable.
*Comparative.
[#]from melt crystallized sample

The invention claimed is:

1. A process for producing a polymer of ethylene containing from 0.1 to 99% by mol of at least one derived unit of alpha-olefins of formula $CH_2=CHZ$, wherein Z is a $C_2$-$C_{20}$ alkyl radical, and optionally from 0 to 5% by mol polyene, comprising contacting, under polymerization conditions, ethylene, said at least one alpha-olefin and optionally said polyene, in the presence of a catalyst system obtained by contacting:

a) a metallocene compound of formula (IV) or (V):

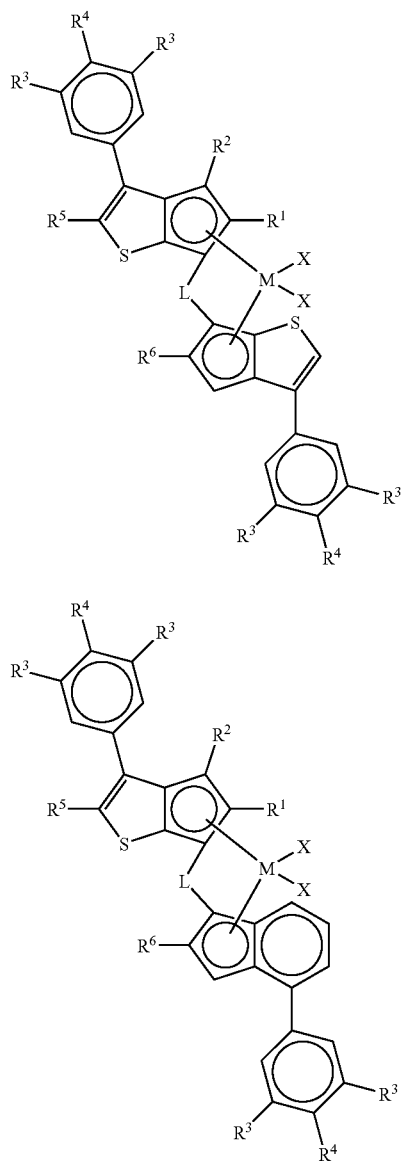

wherein

M is zirconium, hafnium or titanium;

X, equal to or different from each other, is a hydrogen atom, a halogen atom, an R, OR, $OSO_2CF_3$, OCOR, SR, $NR_2$ or $PR_2$ group, wherein R is a linear or branched, $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing at least one heteroatom belonging to groups 13-17 of the Periodic Table of the Elements; two X can join to form a $C_4$-$C_{40}$ dienyl ligand;

$R^1$ and $R^6$ are each independently a linear or branched, $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radical, optionally containing at least one heteroatom belonging to groups 13-17 of the Periodic Table of the Elements;

$R^2$, and $R^5$, equal to or different from each other, are hydrogen atoms, halogen atoms, linear or branched, $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing at least one heteroatom belonging to groups 13-17 of the Periodic Table of the Elements;

$R^3$ and $R^4$ are each independently a hydrogen atom or a linear or branched, $C_1$-$C_{10}$-alkyl radical, optionally containing at least one halogen atom, wherein when $R^3$ is a hydrogen atom, $R^4$ is a linear or branched, $C_1$-$C_{10}$-alkyl radical, optionally containing at least one halogen atom, and when $R^3$ is a linear or branched, $C_1$-$C_{10}$-alkyl radical optionally containing at least one halogen atom, $R^4$ is a hydrogen atom;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals, optionally containing heteroatoms belonging to groups 13-17 of the Periodic Table of the Elements, or a silylidene radical containing up to 5 silicon atoms;

b) an alumoxane or a compound that forms an alkyl metallocene cation.

2. The process according to claim 1 wherein the catalyst system further comprises an organo aluminum compound.

3. The process according to claim 1 wherein in the compound of formula (IV) or (V), X is a halogen atom, an R or OR group; $R^1$ and $R^6$ are each independently a linear or branched, $C_1$-$C_{20}$-alkyl radical; $R_2$ is a hydrogen atom; and L is $Si(CH_3)_2$, $SiPh_2$, SiPhMe, $SiMe(SiMe_3)$, $CH_2$, $(CH_2)_2$, $(CH_2)_3$, $C(CH_3)_2$, $C(Ph)_2$ or $C(CH_3)(Ph)$.

4. The process according to claim 1 wherein, in the compounds of formula (IV) and (V), when $R^3$ is a hydrogen atom, $R^4$ is $C(R^7)_3$, wherein $R^7$, equal to or different from each other, is a linear or branched, $C_1$-$C_8$-alkyl radical; and when $R^4$ is hydrogen, $R^3$ is $C(R^7)_3$.

5. The process according to claim 1 wherein the catalyst system is supported on an inert carrier.

6. The process according to claim 5 wherein the inert carrier is a polyolefin.

7. The process according to claim 1 wherein the process is carried out in gas phase.

8. The process according to claim 1 wherein the alpha-olefin is 1-pentene, 1-hexene or 1-octene.

* * * * *